United States Patent [19]

Kwech

[11] Patent Number: 4,913,742
[45] Date of Patent: Apr. 3, 1990

[54] PROCESS OF MAKING CEMENT CLINKER AND APPARATUS FOR PERFORMING SAID PROCESS

[75] Inventor: Ludwig Kwech, Kaltenleutgeben, Austria

[73] Assignee: Voest-Alpine Aktiengesellschaft, Linz, Austria

[21] Appl. No.: 556,673

[22] PCT Filed: Apr. 15, 1983

[86] PCT No.: PCT/AU83/00010

§ 371 Date: Dec. 5, 1983

§ 102(e) Date: Dec. 5, 1983

[87] PCT Pub. No.: WO83/03601

PCT Pub. Date: Oct. 27, 1983

[51] Int. Cl.⁴ ............................ C04B 7/02; C04B 7/36
[52] U.S. Cl. .......................................... 106/100; 431/5
[58] Field of Search ........................... 106/100; 431/5;
110/210, 211, 212, 213, 214

[56] References Cited

U.S. PATENT DOCUMENTS

| | | | |
|---|---|---|---|
| 4,179,263 | 12/1979 | Jung et al. | 106/100 |
| 4,295,823 | 10/1981 | Ogawa et al. | 106/100 |
| 4,353,750 | 10/1982 | Quittkat | 106/100 |

Primary Examiner—William R. Dixon, Jr.
Assistant Examiner—Melissa Bonner
Attorney, Agent, or Firm—Townsend and Townsend

[57] ABSTRACT

A process for producing cement clinker, having a preheating-, calcination and cooling zone, under addition of a secondary fuel, (retardedly)combustible components such as waste materials and/or conventional fuels being added in the zone between kiln inlet and calcination zone and then being subjected to an incomplete combustion and/or pyrolysis under addition of exhaust gases from the burning process.

The gases thus formed are introduced into the calcination zone as secondary combustion gas together with the exhaust gas from the burning process and are burned there with tertiary air and optionally with conventional secondary fuel.

The plant required for performing the process consists of a system of heat exchangers (2), a calcining kiln (3a), a burnin kiln (10) and a clinker cooler (13).

The calcining kiln (3a) is provided with a means (4) for introducing tertiary air and/or oxygen preferably preheated (m) in the clinker cooler (13) and optionally with a means (15) for introducing a conventional fuel. At least one each line (7) is provided for the introduction of raw material into the kiln and at least on each line (6) is provided for discharging the exhaust gases formed in the combustion of the primary fuel in the kiln (10) and of the fuels added.

A means (8) is provided in the area between kiln inlet (9) and calcination zone for the introduction of the additional fuels.

7 Claims, 1 Drawing Sheet

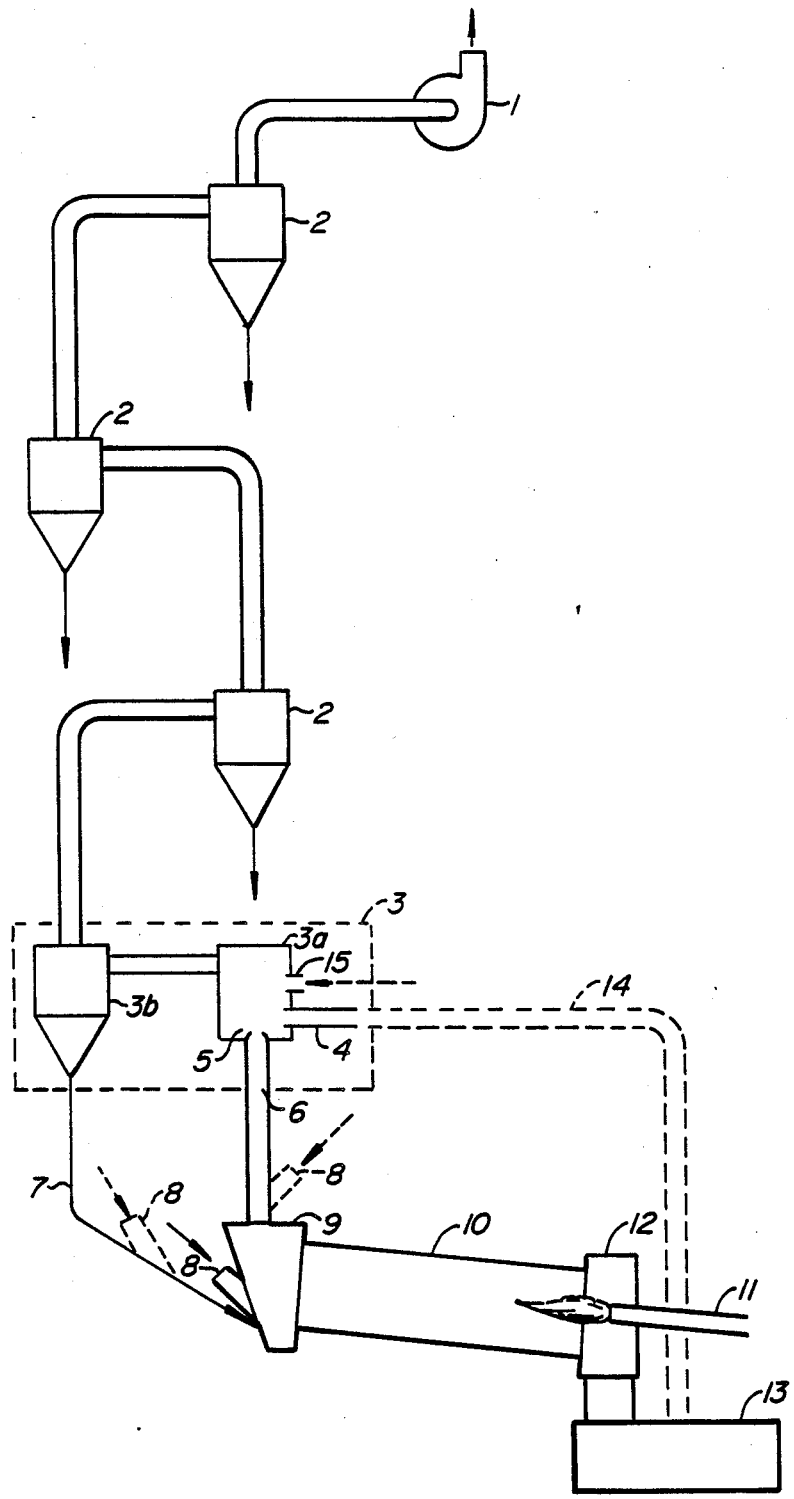
FIG._1.

PROCESS OF MAKING CEMENT CLINKER AND APPARATUS FOR PERFORMING SAID PROCESS

BACKGROUND

The invention relates to a process of making cement clinker and to an apparatus for performing said process.

The process of making cement clinker may be subdivided into three different steps. In the first step, the finely ground raw material is heated to about 600° C. In this step, no essential reactions take place, with the exception of the dehydration of the clay (alumina) minerals. The second process step is characterized by the highly endothermic reaction of deacidifying the calcium carbonate. The third process step comprises further heating of the material to sintering temperature and the mildly exothermic reaction of clinker mineral formation. From the viewpoint of energy, the deacidification of the calcium carbonate is most important, as according to H. Kühl "Zementchemie", VEB-Verlag Technik Berlin 1959, page 354 (Volume II), it entails an evolution of heat of 1638 kJ/kg. Since conventional cement raw meal contains about 75 percent of limestone, the main share of energy in the cement burning process is required in the deacidifying step, i.e. within a temperature range of about 650° to 950° C.

Taking this fact into consideration, early attempts were made to separate the individual steps of the cement production process. The most widely known processes developed on this basis are the Lepol process and, above all, the heat exchanger process in which preheating and part of the deacidification take place on a grate or in cyclone heat exchangers. In both processes, the transition of heat between the hot combustion gases and the raw material is greatly improved as compared to the long rotary kilns customary during the initial era of cement production. In both processes, however, a relatively low degree of deacidification is achieved on the grate or in the cyclones. So, for instance, only about 20 to 25 percent of the limestone are deacidified in a conventional heat exchanger furnace after the last cyclone stage or in the furnace inlet zone. This degree of deacidification which is relatively low in view of the temperatures within the furnace inlet zone is explained, a.o., by the fact that the sojourn time of the raw material to be deacidified in the heat exchangers is comparatively very short.

In the course of rationalization measures, socalled secondary burners have been provided in the zone of the last cyclone stage during the past ten years, so as to concentrate the energy supply on the deacidification zone. This greatly relieves the sintering zone of the furnace, although the combustion air required for the fuel introduced by the second burner must usually be supplied through the furnace. For this reason, a further development provides for the combustion air required for the secondary burners to be no longer supplied as secondary air, but instead separately as tertiary air, preferably as preheated hot cooler air. In this way, the furnace can be further relieved.

In the practice of cement clinker production, two variants of the use of secondary fuel have been applied to a fairly great extent.

In the first variant, secondary fuels are introduced into heat exchanger furnaces of conventional construction in the temperature range of about 650° to 1000° C., i.e. as a rule in the range between furnace inlet and lowest cyclone stage of the heat exchanger. This can normally be achieved without high investments. The secondary fuels used are heavy fuel oil, gas, coaldust, but also waste products of constant calorific value such as scrap tires. The gaseous, liquid or fine-grained fuels are burned in admixture with the raw meal coming from the heat exhanger; the coarse-grained materials, such as scrap tires, are burned at the furnace inlet or conveyed into the furnace where they are burned. The amount of secondary fuel to be used is limited in both cases. It is normally not possible to meet more than 20 to 25 percent of the total energy requirement in this way by using secondary fuels. If this value is exceeded, the Co-content in the furnace exhaust gas is greatly increased, the exhaust gas temperature rises together with the total energy requirement. The degree of calcination cannot be essentially increased in this way by the use of secondary fuels. It is therefore necessary to supply the amount of energy required in the furnace for complete deacidification via the primary burner of the furnace. According to past experience, this is no longer possible if the share of secondary fuels is too high.

The use of coarse-grained materials such as scrap tires is on principle successful when they are introduced into the kiln itself where an adequate degassing and burning time is available. It is naturally not possible in this case to use tertiary air, instead, the entire air required for the combustion of these secondary fuels must be supplied through the kiln. This results in an essentially increased rate of gas flow and thus an increased dust circulation, and, as a further consequence, in the transfer of already deacidified hot raw meal from the kiln into the heat exchanger. The heat is, so to speak, abducted from the kiln into the heat exchanger. This results in increased scab (scar) formation in the heat exchanger and a corresponding increase in the total energy requirement.

The second variant, which is pratically used in new plants only, provides for the combustion of the secondary fuels in a separate combustion chamber which is frequently called calcinator. Several suggestions for such calcinators have been made. They all have in common a prolonged sojourn time of the raw meal, high investment rates and an increased input of electric energy due to the pressure drop in the calcinator. Only high grade fuels are suitable as secondary fuels. In order to relieve the sintering zone, the air required for the combustion of these fuels is frequently supplied to the calcinator not through the kiln, but via a separate line, preferably as hot cooler air. Suitable calcinators can achieve a degree of calcination of more than 80 and up to about 95 percent. Difficulties frequently arise because this operation results not only in the deacidification of the raw meal, but also in the formation of melt phases and scab which change the flow rate of the gas and impede the transport of the deacidified raw meal into the kiln.

SUMMARY OF THE INVENTION

It was surprisingly found that in the new process described in the following, the share of secondary fuels can be considerably increased and the quality of the secondary fuel can at the same time be considerably lowered without particular investments, using conventional heat exchanger furnaces. The economy of the cement clinker production process can thereby be increased considerably.

An essential feature of the present invention resides in the fact that a secondary fuel is introduced at the kiln inlet or in the zone between kiln inlet and preburning zone of the process in an amount which is strongly increased as compared to conventional processes or to the oxygen available for combustion in this zone, so that a marked deficiency of air prevails at the site of introduction of the secondary fuel.

In this, combustion gases are released from the secondary fuels and are then utilized in a subsequent combustion for the calcination (deacidification) of the raw material.

The object of the present invention is thus a process of making cement clinker in which the, preferably finely ground, raw material is heated in a preheating zone, preferably in a system of cyclone heat exhangers, is then at least partially deacidified in a calcination zone with secondary firing, in particular a calcining kiln, with supply of a secondary fuel and of tertiary air and is then subjected to a burning process, preferably in a burning kiln, the burned clinker being cooled in a cooling zone, for instance a clinker cooler; the process is characterized in that materials containing combustible components, preferably coarsely crushed, optionally undivided materials, in particular materials with retarded combustion, preferably waste materials and/or conventional fuels, are added in the zone of introduction of the preheated raw material into the burning process, preferably in the inlet zone of the burning kiln, and/or in the zone between kiln inlet and calcination zone which is formed by a calcining kiln and/or the lowest stage of the cyclone system, that said materials are subjected to incomplete combustion and/or pyrolysis under addition of the exhaust gas formed on the combustion of the primary fuel in the burning process and that the gases formed are fed to the calcination zone, in particular the calcining kiln, as secondary combustion gas together with the exhaust gas from the burning process and are burned there under addition of tertiary air, optionally under addition of conventional secondary fuels.

BRIEF DESCRIPTION OF THE DRAWINGS

FIG. 1 is a schematic diagram of a preferred embodiment of an apparatus for carrying out the process of the present invention.

DETAILED DESCRIPTION OF THE PREFERRED EMBODIMENT

The essence of the invention thus resides in the measure that the combustion of the secondary fuel is substantially divided into two steps. In the first step, an incomplete combustion and/or merely a pyrolysis of the secondary fuel takes place, releasing the secondary combustion gas which is then subjected to complete combustion in the second step, the calcination step. The heat generated in this two-step combustion of the secondary fuel, in particular in the combustion of the secondary combustion gas, is utilized for the deacidification of the raw material, in particular the raw meal.

Under the conditions of the first step, the incomplete combustion, the following reaction takes place, providing that oxygen is available at all:

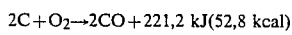

Since temperatures of more than 1000° C. prevail within the area of the inlet site, the equilibrium of the reaction is strongly shifted to the right under the conditions of air deficiency. It was now surprisingly found that under these conditions, the secondary fuels used may be very low grade, coarsely crushed or even undivided materials and/or materials with retarded combustion which up to now could not be used in a cement burning process due to their low calorific value. It was even possible to use waste materials of comparatively high water contents, in which case the following reaction takes place:

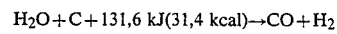

As already mentioned, the total volume of gas introduced into the calcination zone is composed of the exhaust gas formed on the combustion of the primary fuel, on the one hand, and of the gases liberated on the incomplete combustion and/or pyrolysis of the secondary fuels, thus on their combustion or heating at air deficiency, on the other hand; these gases are called secondary combustion gas. The secondary combustion gas consists mainly of (a) carbon monoxide CO (from the combustion of the carbon of the secondary fuel at air deficiency or from the reaction of the water contained in the secondary fuels with carbon)

(b) hydrogen $H_2$ (from the reaction of the water contained in the secondary fuels with carbon)

(c) gases, for instance hydrocarbons, formed by pyrolytic decomposition of the secondary fuels and (d) optionally further volatile compounds, such as sulphur compounds, formed by decomposition of the secondary fuels.

The composition of the secondary combustion gas can naturally vary within a wide range as a function of type and volume of the secondary fuels used.

The secondary fuels used can be waste products of all types, such as plastic material scrap, in particular polyethylene, polyvinyl acetate, polyamide, polyvinyl chloride and the like, in particular cords, stockings, knitwear scrap and similar plastics scrap difficult to break up, natural or synthetic rubber products, in particular automobile and scrap tires, rubber, garbage, in particular household garbage and/or bulk goods, slaughterhouse scrap, fats, animal cadavers, waste acids, textiles, paper, wood, straw, sulfite waste liquors, phenol-containing waste products, oil-containing waste products from the sewage purification plants of refineries or petrochemical plants as well as sediments from oil tanks, oil separators, oil-containing grinding dust, scum from sewage treatment plants, oil emulsions, waste from gasoline separators, scrap oils, waste solvents, varnish residues, porous rock, in particular perlite or burnt lime, saturated with oil, varnishes or similar organic products, for instance from tanker accidents, refinery sludge, printer's ink, sapropel, crude sludge, preliminary sedimentation sludge, and/or excess sludge, or mixtures of these materials, optionally in mixture with conventional fuels.

Materials containing combustible components burning off within more than 20 seconds, preferably more than 2 minutes, in particular more than 10 minutes, may be added to the process without difficulty.

As already mentioned, a conventional secondary fuel may be added to the calcination zone in addition to the secondary combustion gas liberated from the secondary fuel. This is of particular interest and advantage if materials with varying shares of combustible components or strongly varying combustion or pyrolysis rates are employed in the process according to the invention, as this would cause fluctuations in the volume and/or the calorific value of the secondary combustion gas formed.

The total heating power is controlled by the metered combustion of a second, conventional secondary fuel in said calcination zone.

By using a means for the current determination of the volume and the calorific value of the secondary combustion gases formed and/or the composition of the exhaust gas discharged from the calcining kiln, it is possible to control the supply of the additional secondary fuel, such as a fuel gas or oil, to the calcination zone, so that finally, a mixture of secondary combustion gas and conventional secondary fuel, whose total heating power is kept essentially constant and subject to minor fluctuations only, is supplied to the calcination zone, although the secondary fuel employed according to the invention for the formation of the secondary combustion gases is subject to comparatively strong fluctuations in its quality and combustion properties.

A further advantage of the process according to the invention resides in the fact that the tertiary air is not, as customary, added to the calcination zone prior to the addition of the secondary fuels, but instead that the gases discharged from the burning kiln already contain the secondary fuel, namely, the secondary combustion gas and that in this way, the tertiary air is, so to speak, added afterwards.

It is preferred to burn the secondary combustion gas obtained by the incomplete combustion and/or pyrolysis in the calcination zone together with tertiary air preferably preheated in the cooling zone, for instance in the clinker cooler, and/or with optionally preheated oxygen.

In the complete combustion of the secondary fuel, it cannot be expected in practice that the equilibrium ratios given in the equations indicated above will be established. For safety reasons, the secondary combustion gas should further be free of $O_2$.

It is therefore of advantage to adjust the Co-content of the secondary combustion gas to more than 3 percent by volume, preferably 7 percent by volume, in particular 15 percent by volume. It is further of advantage to conduct the process in such a way that the $CO_2$-content of the secondary combustion gas is adjusted to a value which is less than 8 percent by volume, preferably less than 4 percent by volume, in particular 2 percent by volume above the $CO_2$-content of the exhaust gas formed in the combustion of the primary fuel in the burning process.

Considering the endothermic reaction of the water in the incomplete combustion, the water content of the secondary fuels should be limited, preferably to 0 to 15 percent, in particular to 0 to 8 percent and particularly preferred to 0 to 5 percent.

The secondary combustion gas is supplied to the area of the process in which the deacidification of the raw meal takes place, together with the kiln flue gases formed on the combustion of the primary fuels in the burning kiln. Here, the secondary combustion gas burns according to the following reaction:

$$2CO + O_2 \rightarrow 2CO + 567,3 \text{ kJ}(135,4 \text{ kcal})$$

as well as optionally $$2H_2 + O_2 \rightarrow 2H_2O + 572,4 \text{ kJ}(136,6 \text{ kcal}) \text{ and}$$
$$\text{hydrocarbons} + O_2 \rightarrow CO_2 + H_2O + \text{energy}.$$

If the energy released in the individual reactions is rated with respect to the amount of carbon in the secondary fuel employed, it appears that up to about 28 percent of the energy are liberated in the combustion of CO and the remainder is liberated in the combustion of $CO_2$ (on the assumption that the secondary fuel employed consists of pure C and the secondary combustion gas contains only CO.)

As briefly mentioned above, the utilization of the secondary fuel in the process according to the present invention is carried out in two steps. In the first step, the combustible substance of the secondary fuel, in particular the carbon, is converted in the area of the kiln inlet or in the kiln itself to combustible gas, in particular carbon monoxide. It is immaterial at which rate this conversion occurs, as sufficient time in the kiln is available for this purpose. The combustible gases obtained from the secondary fuels are then conveyed to the second process step in which the combustion of the carbon monoxide and optionally of the hydrogen and the other volatile components takes place. Since these gases are without exception fast burning substances and the gaseous compounds are moreover intimately mixed with the raw meal to be deacidified, the sojourn time of the raw meal can be kept very short during this second process step and it is possible to operate with a very low air excess. By this distribution of the utilization of the secondary fuel over two steps, namely, to the area of the kiln inlet or the kiln itself, on the one hand, and to the very area of deacidification, on the other hand, it is possible to employ solid, low grade, slow burning and/or water-containing secondary fuels and still achieve high calcination degrees of more than 90 to 95 percent without difficulty.

The substantial difference of the process according to the invention as compared to the state of the art resides in the fact that up to now, the usually solid waste materials have been subjected to a one-step and feasibly complete combustion. If a mildly reducing combustion occurred, this was an unwanted disturbance which was never knowingly attempted, but was suppressed as far as possible.

In contrast, the process according to the invention knowingly aims at an incomplete combustion or mere pyrolysis under controlled conditions.

It was found that the clinker obtained according to the invention discharged from the cooler does not contain any reduced components, and this in spite of the "reducing" conditions. This means that clinker components such as divalent or metallic iron, sulfide and the like, which might have been reduced in the area of the kiln inlet, are with high probability re-oxidized in the oxidizing zone of the kiln, in particular in the sintering zone. As a result, no difference in the solidification behavior and strength development of a clinker obtained according to the invention and a clinker obtained by a conventional process could be observed.

It was already mentioned that the kiln is subjected to considerable stress if the entire combustion air needed for the secondary fuels is led through it and that, due to the high gas flow rates generated thereby, the resulting increased dust circulation carries already deacidified, hot raw meal from the kiln back into the heat exchanger. The step-wise combustion of the secondary fuels provided according to the invention permits the use of tertiary air, although the secondary fuels are simply used in the area of the kiln inlet or in the kiln itself. To give an example, the combustion of the carbon contained in the secondary fuels to carbon monoxide requires by 50 percent less air than the combustion to carbon dioxide. The necessary balance is directly supplied to the deacidification zone as tertiary air and does not stress the kiln. This essential reduction in quantity of the gases to be conveyed in the kiln decisively decreases the dust circulation and results in a strong improvement of the energy balance and in a decrease of scab formation in the area of the kiln inlet.

This reduction of the gases conveyed in or through the kiln makes it possible to either improve the kiln efficiency at equal flow rates in the kiln and equal dimensioning or to strongly improve the flow rates at equal efficiency and kiln dimensioning, thus to reduce the gas flow rates in the kiln, or to essentially reduce the diameter of the kiln at equal efficiency and equal flow rates, which ultimately results in reduced investment costs and substantially improved life of the kiln lining.

It is of particular advantage that according to the invention, the combustion of the secondary combustion gas can be carried out under precisely defined and controlled conditions.

According to a preferred embodiment of the invention, the combustion of the secondary combustion gas is carried out in a separate calcining chamber which is arranged between the inlet site of the secondary fuels and the conventional preheating or preburning zone, for instance the last cyclone stage of a heat exchanger. In this calcining chamber, the secondary combustion gas mixed with the heated raw meal is burned, preferably in the fluidized bed process. It was found that under the prevailing conditions, the air excess required for the complete combustion could be reduced to half when using low grade secondary fuels. The air required for the combustion of the secondary combustion gas is added as tertiary air (see above). Particularly good results are achieved by the intimate mixing of the secondary combustion gas with the raw meal particles and by the energy supply and the resulting deacidification within a limited temperature range. This is due to the fact that in the selected process, the deacidification does not extend over a wide temperature range of several hundred degrees Centigrade, but can instead be limited to a narrow temperature range. This entails the advantage that the deacidification is effected very rapidly, but a highly reactive calcium oxide is formed, similar to that obtained in the lime industry during the production of soft burned lime.

A further object of the invention is a plant for performing said process, consisting essentially of a system of heat exchangers, in particular cyclone heat exchangers, which is preferably connected via a calcining kiln with a kiln which is followed by a clinker cooler; the plant is characterized in that the calcining kiln and/or the lowest stage of the, optionally multipath, cyclone systems are provided with a means for introducing tertiary air and/or oxygen preferably preheated in the clinker cooler and optionally a means for introducing a conventional secondary fuel and are each connected to the kiln via at least one line for introducing raw materials to the kiln and via at least one line for discharging the exhaust gas formed in the kiln at the combustion of the primary fuel, and for discharging the secondary combustion gas obtained upon the incomplete combustion and/or pyrolysis of materials containing combustible components, preferably waste materials, with a means, preferably a gas-tight gate, for introducing the materials containing the combustible components, preferably waste materials, arranged in the area of the kiln inlet and/or in the line for introducing the raw material into the kiln and/or in the line for discharging the kiln exhaust gas and the secondary combustion gas.

The process according to the invention and the plant for performing it are explained in detail in the following with reference to the accompanying drawing: the raw material to be burned is conveyed via an optionally multipath system of cyclone heat exchangers 2 provided with a suction blower 1 through the calcination zone 3 which comprises the calcining kiln 3a destined for the calcination of the raw material and a separator means 3b. From the calcination zone 3, the raw material is conveyed through the supply line 7 to the inlet 9 of the kiln 10 which is shown in the drawing as a rotary kiln.

The raw material passes through the rotary kiln 10 provided with a burner 11 supplied with primary fuel and primary air, passes through the sintering zone of the kiln and is discharged from it at the kiln end 12 as finally burned, hot clinker which is then cooled in the clinker cooler 13 and subsequently processed by grinding, sifting or the like (the processing operations are not shown.)

The hot kiln exhaust gases formed in the burner 11 of the kiln 10 upon burning the primary fuel first serve to complete the sintering of the raw meal in the kiln and are then conveyed via the exhaust gas discharge 6 to the calcining kiln 3 or a lowest cyclone stage formed as a calcining kiln.

A means, in particular a gate 8, for introducing the secondary fuel is provided in the line 6, in the line 7 and/or directly at the kiln inlet 9. This fuel, which may be merely coarsely crushed waste, is supplied to the inlet zone 9 of the kiln an is there heated by the hot kiln exhaust gases in which a deficiency of air or oxygen is adjusted in relation to the amount of combustible substances in the secondary fuel, the fuel then decomposes and either burns incompletely or pyrolyses.

The gases liberated in this operation, such as CO, hydrocarbon cracking gases, $CH_4$, $H_2$ or the like, which form the secondary combustion gas, are supplied to the calcining kiln 3 together with the exhaust gas leaving the kiln 10 through the exhaust gas discharge 6 and are there burned under separate addition of tertiary air via the supply point 4. The heat liberated in this serves for the completion of the deacidification of the raw material.

The tertiary air required for the combustion of the secondary combustion gas can advantageously be supplied to the calcining kiln 3 through the line 14 passing through the clinker cooler.

The supply line 15 in the calcinator 3, 3a can additionally be used for the introduction of a conventional secondary fuel into the calcination zone 3, which is of particular advantage for compensating fluctuations in volume and calorific value of the secondary combustion gas.

The supply means 8, in particular gate, for the secondary fuels to be incompletely burned and/or converted to gas in the oxygen deficiency can optionally also be provided in the pyrolysis zone of a calcining kiln divided into a pyrolysis zone and a calcination zone separated therefrom; this pyrolysis zone will then, according to the invention, also be located between kiln inlet and calcination zone.

What is claimed is:

1. A process for producing cement clinker in which the raw material is heated in a preheating zone, is then at least partially deacidified in a calcination zone with secondary firing and then subjected to a burning process, whereupon the burned clinker is cooled in a cooling zone, comprising:

adding a first secondary fuel in the form of waste materials including combustible components in the introduction zone of the preheated raw material into the burning process;

adding to said introduction zone the exhaust gas formed upon the combustion of the primary fuel in the burning process;

subjecting the secondary fuel to incomplete pyrolysis;

feeding the gases thus formed upon such pyrolysis to the calcination zone as secondary combustion gas together with the exhaust gas from the burning process;

adjusting the CO-content of said secondary combustion gas to more than 3 percent by volume; and burning said secondary combustion gas and exhaust gas in said calcination zone.

2. A process according to claim 1, further comprising adjusting the $CO_2$-content of said secondary combustion gas to a value which is less than 8 percent by volume above the $CO_2$-content of the exhaust gas formed in the combustion of a primary fuel in the burning process.

3. A process according to claim 1 or 2, wherein said secondary fuel has a water content of up to 15 percent by weight.

4. A process according to claim 1 or 2, including the step of burning said secondary fuel over a period of time greater than 20 seconds.

5. A process according to claim 1 or 2, including the step of controlling the total heating power by adding a metered combustion of a second secondary fuel to said calcination zone.

6. A process according to claim 1 or 2 including the step of burning said secondary fuel over a period of time greater than 2 minutes.

7. A process according to claim 1 or 2 including the step of burning said secondary fuel over a period of time greater than 10 minutes.

* * * * *